United States Patent Office 2,891,918
Patented June 23, 1959

2,891,918

SULFITE LIQUOR BASE RESIN AND METHOD OF MAKING THE SAME

Curt Uschmann, Lebanon, Oreg.

No Drawing. Application June 1, 1953
Serial No. 358,979

2 Claims. (Cl. 260—17.5)

The present invention pertains to the preparation of sulfite liquor base resins, particularly utilizing waste sulfite liquor from pulp mills, and the resulting products. The present methods and products constitute a further development of the processes and products disclosed in my Patent No. 2,585,977, and in my copending application Serial No. 272,159, filed February 18, 1952, now Patent No. 2,786,820, and this application constitutes a continuation in part of the latter application.

The principal object of my present invention is to improve in various respects the quality of resin obtained from waste sulfite liquor to render it suitable for more diversified uses. While the products disclosed in my previous patent and application mentioned above were suitable for use as a binder of woody fibers in the manufacture of fiberboard and to some extent were useful in adhesives utilized in plywood manufacture, the products of this invention have considerably better binding properties, both for use in the manufacture of hardboard and in an adhesive for use in the manufacture of plywood, as well as for other uses.

A more specific object of the present invention is to utilize, in the production of resinous material from sulfite liquor, various additives which impart desirable characteristics to the resin.

Specifically it is an object to use additives in sulfite liquor resin when it is to be mixed with phenol formaldehyde thermosetting resin for the purpose of increasing the stability or storage life of the adhesive, both in liquid form before it is spread on the wood and after it has thus been spread and between such application and actual setting of the resin under heat and pressure. Such additives have a similar beneficial effect on phenol formaldehyde thermosetting resins alone.

The products of the present invention are useful not only as a binder for fiberboard and as an adhesive for veneer in the production of plywood and for furniture making, but are also suitable for use in bonding paper sheets to wood or to hardboard, hardboard sheets to hardboard, wood or plywood, and as a binder for foundry sand cores and molds.

More specifically, it is an object to incorporate in the sulfite liquor base resins additives for one or more of the following purposes: To plasticize the resin and deter settling of its lignin components; to increase the period during which resin ready for use can be kept exposed to the air without substantial deterioration of its adhesive properties; to prolong the effectiveness of the resin after application to the surface to be bonded and before the bonding operation; to deter absorption of the resin into the wood so that equal binding action between wood layers can be effected with less resin; and generally to increase the effectiveness of the sulfite liquor resin as a binder or adhesive.

In the use of sulfite liquor base resins according to the present invention it is an object to combine them with thermosetting phenol formaldehyde resin for application in bonding veneer, paper and hardboard in various ways.

A specific object is to impregnate absorbent paper sheets with such a combination of sulfite liquor base resin and thermosetting phenol formaldehyde resin for use as a glue line sheet.

In general the procedure for producing resins in accordance with the present invention follows that utilized in my prior patent and application mentioned above, in that waste sulfite liquor from a pulp mill is concentrated by evaporation in the presence of caustic and thereafter additional caustic may be added, and subsequently furfural and perhaps in addition phenol are added during continued cooking. In addition it has been found that the stability, homogeneity and effectiveness of the resin as a binder can be increased substantially by the addition of metal chlorides during the cooking process, including nickelous chloride, cobaltous chloride, chromic chloride, copper chloride, aluminum chloride, stannous chloride and vanadium chloride. An additional and very effective plasticizing agent has been found to be triethylene glycol.

Additives useful to deter absorption of the resin into the wood, and which are of particular value as stabilizing agents to lengthen the period during which the resin can be kept in liquid form without appreciable deterioration and the period during which the thermosetting properties of the resin will not deteriorate appreciably between being spread on a wood, paper or fiberboard surface and application of heat and pressure for setting the resin, are certain metal naphthenates including cobalt naphthenate, manganese naphthenate, lead naphthenate, zinc naphthenate, calcium naphthenate, and copper naphthenate. Copper naphthenate has the further advantage of improving the fungusproof and rotproof qualities of the resin. Zinc naphthenate has the advantage of fireproofing.

The binding and waterproofing quality of the resin is improved by the addition of a resin soap designated Vinsol NVX, which is a product of Hercules Powder Company, or a cumar resin. Vinsol NVX is a sodium soap produced by the reaction of sodium hydroxide with resin obtained from wood of pine trees. As a representative cumar resin, para-cumarone-indene dissolved in furfural can be used.

Sulfite liquor resin including one or more of such additives may be combined with phenol formaldehyde thermosetting resin of the type customarily used in the manufacture of plywood, such as Resin No. 1195 of Reichhold Chemicals, Inc., Resin No. 4645 of American-Marietta Company, Resin No. W115 of the Borden Company, and Resin No. 542 of Monsanto Chemical Company. In addition, inert extender or filler material may be utilized in such a resin mixture, as is customary in using thermosetting phenolformaldehyde resin, such as comminuted Douglas fir bark, one form of which is sold by Weyerhaeuser Timber Company under the name Silvacone.

In the production of sulfite liquor resin incorporating ingredients discussed above, various types of cooking equipment and processes can be used, and the several ingredients can be added in different order or at different stages of the cooking. In order to capture and retain volatile ingredients of the sulfite liquor, and finally by continued cooking to convert them into integral components of the resin, it is preferred that the cooking take place in a closed cooker having provision for condensation of vapors and their return to the cooking liquid, designated cooking under reflux. The cooking should be conducted at or near the boiling point of the concentrated waste sulfite liquor and may be under a small pressure or vacuum. The cooking temperature will therefore normally be in the neighborhood of 214°

F. to 216° F., although because of the exothermic character of the reaction with some ingredients the temperature may rise at times to 240° F. or so. The cooking may be continued uninterruptedly in such a cooker while the various ingredients are added from time to time.

The sulfite liquor, if obtained from pulp cooking as a waste product, may be of the sodium sulfite, ammonium sulfite, or other sulfite type used in pulp cooking and should first be concentrated until the content of solids has been increased from between eight percent and twelve percent to between forty-five percent and fifty-five percent solids by weight. Such concentration procedure should be performed preferably in the presence of caustic soda, that is, sodium hydroxide, in the amount of about one percent dry weight of the weight of the sulfite liquor.

In the cooking process of this sulfite liquor concentrate, while it is boiling, preferably from four to six percent by weight of dry sodium hydroxide will be added, so that the resultant resin will contain sodium hydroxide in the amount of from two to three percent of the original sulfite liquor by weight or from five to twelve percent of the concentrated sulfite liquor or completed resin by weight.

In addition, during the cooking, furfural is added in one or more stages to the extent of five to eight percent by weight of the liquor concentrate or completed resin.

Preferably all or at least part of the furfural is added after the sodium hydroxide and before most of the other ingredients are added.

In conjunction with part or all of the furfural an emulsifying and film forming resin soap discussed above is added in an amount of one-quarter percent to one and one-half percent by weight of the concentrated sulfite liquor or finished resin. Such sodium resin soap is dissolved in furfural or water for addition to the liquor while cooking.

An optional ingredient is chloride, discussed above, and one or more of the chlorides mentioned can be used. The action of such chlorides has been found to be particularly beneficial if at least a portion of the chloride additive is added prior to the addition of furfural, and preferably even prior to the addition of the sodium hydroxide, to the concentrate. In fact, if the chloride is added to the sulfite liquor concentrate in a pretreatment with gentle or intermittent agitation of the concentrate at a temperature below boiling for a period of hours, the subsequent resinification of the liquor during the boiling operation occurs much faster than otherwise is the case. In this operation the principal function of the chloride is to plasticize the solid content of the sulfite liquor concentrate, that is, to render it generally comparable to the character of thermosetting phenol formaldehyde resin. In this plasticizing action the chloride produces abietic crystals resembling the colloidal character of a supercooled liquid, which also is characteristic of thermosetting phenol formaldehyde resin.

To produce the desired plasticizing effect only a small amount of chloride is required, such as from one-twentieth percent to one-half percent by weight of the concentrated sulfite liquor or completed resin. The various metal chlorides mentioned vary somewhat in the degree of their effectiveness, and preferably a combination of a plurality of chlorides is used for best results, but the addition of considerably greater quantities of chloride than mentioned above does not appreciably improve the results.

The chloride, whether of one or more metals, is dissolved in reflux condensate when added in the latter part of the sulfite liquor cooking process in order not to dilute the mass with water. Where the chloride is added in the pretreatment conditioning of the concentrated sulfite liquor, however, the chloride may be dissolved in water before being added to the concentrate.

An improved plasticizing action, particularly where chloride is used, is obtained by the addition of a small amount of triethylene glycol to the sulfite liquor concentrate prior to the cooking operation. One-tenth to one-half of one percent of the weight of the concentrated sulfite liquor or of the finished resin by weight is a sufficient quantity of triethylene glycol.

To stabilize the sulfite liquor base resin so that its thermosetting properties will not deteriorate appreciably even though the completed resin may stand in the open air for several weeks or more before being applied to the wood, fiberboard or other product to be bonded, and even though after being thus applied to the surface to be bonded the resin is allowed to stand again for several weeks or more before it is subjected to activating heat and pressure, naphthenate is incorporated in the resin. While a single naphthenate may be adequate for this purpose, a combination of naphthenates usually is preferable for greatest effectiveness and economy. Cobalt naphthenate and manganese naphthenate are the most effective stabilizing agents, but copper naphthenate is also valuable for its fungusproof and rotproofing qualities. Cobalt naphthenate or manganese naphthenate can be used alone, or they can be used together and are effective to produce the desired stability of the resin in quantities from one-tenth of one percent to one-half of one percent by weight of the concentrated sulfite liquor or completed resin. Copper naphthenate may be used in a similar quantity range. Employment of a greater amount of naphthenate will not appreciably improve the qualities of the resin and is not necessary. Use of one-tenth of one percent of naphthenate is about as effective as use of one-half of one percent, and use of two-tenths to five-twentieths of one percent is the most effective, while use of substantially more than one-half of one percent does not improve the keeping qualities of the resin appreciably and a larger amount still may even be detrimental to such properties.

Various naphthenates are available for this purpose in different concentrations, and their effectiveness varies with the metal concentration and type. Thus petroleum solvent solution containing six percent of any of the metals manganese, zinc and copper are of approximately the same effectiveness as a solution containing twenty-four percent of lead. On the other hand, a solution containing only three percent of chromium or cobalt, or half as much of a six percent solution of either of these metal naphthenates, will be approximately equally as effective as the solutions of the metals first mentioned.

Where more than one type of naphthenate are used the naphthenate solutions are mixed together and added to the concentrated sulfite liquor during cooking, and preferably the naphthenates are thus added near the end of the cooking procedure.

The naphthenates have the stabilizing effect described not only on sulfite liquor base resins, but also on resins of other types. Thus manganese naphthenate, for example, in an amount of one-half percent to two percent of thermosetting phenol formaldehyde resin by weight will prolong the storage life of such resin for several weeks or more, and after it has been applied to the surface of veneer or other material to be bonded, its thermal bonding ability will not deteriorate appreciably if it is subjected to heating and bonding pressure after a delay of several months following its application. Comparable quantities of the other naphthenates mentioned will produce equivalent results, and it is unnecessary to use a greater quantity than that mentioned, because the keeping qualities will not be improved appreciably more. Metal naphthenates in similar proportions will also serve as a stabilizer in the same manner for thermosetting urea formaldehyde resin and soya bean base resin as well.

Especially where a more viscous resin is desired formaldehyde in addition to furfural can be incorporated with the sulfite liquor base, and this may be utilized effectively in quantities from one and one-half percent to three percent of the sulfite liquor concentrate or of the completed resin by weight. Preferably the formaldehyde is added at or near the end of the cooking process. At this time also, additionally or alternatively, a similar quantity of phenol may be added.

When the cooking has been completed, the resulting resin can be stored indefinitely for future use.

The sulfite liquor base resin thus obtained may be used without alteration as a binder for sand used in the production of foundry mold cores. Also, this resin can be used satisfactorily without modification as a binder for fiberboard.

While the resulting sulfite liquor base resin has thermosetting properties, it is preferred to mix it with other thermosetting resins of substantially the same pH, such as thermosetting phenol formaldehyde resin, for use in bonding wood, paper, hardboard, etc. In addition, a reasonable proportion of inert filler such as bark flour can be used. Good results can be obtained by mixing the sulfite liquor base resin and thermosetting phenol formaldehyde resin in approximately equal quantities by weight. Bark filler should not constitute more than about twenty-five percent of the resin content of the final adhesive mix. Such adhesive may be used in the conventional way to bond veneer in the manufacture of plywood, or in securing paper or hardboard to wood or hardboard as surfacing materials.

A typical example of ingredients and procedure for making the sulfite liquor base resin without the use of chloride or triethylene glycol plasticizing agents is as follows:

Example I

|   | Lbs. |
|---|---|
| Sulfite liquor concentrated to 45% solids | 1,000 |
| Sodium hydroxide | 40 |
| Sodium resin soap (Vinsol NVX) | 8 |
| Furfural | 60 |
| Cobalt naphthenate | 1 |
| Manganese naphthenate | ½ |

The procedure for preparing the resin using these ingredients in a closed reflux type of cooker is to heat the sulfite liquor concentrate to boiling, which will be a temperature of approximately 216° F. and add the sodium hydroxide in dry flake form. The mixture is boiled under reflux while being agitated for a period of fifteen minutes, after which the furfural containing the sodium resin soap in solution is added. The sulfite liquor concentrate is then boiled under reflux while being agitated for a further period of thirty minutes, at which time the cobalt naphthenate and manganese naphthenate, mixed together, are added. Boiling of the concentrate is then continued for a further period of fifteen minutes and then is allowed to cool at least to approximately 180° F. The concentrate may then be drawn from the cooker and is ready for use.

This sulfite liquor base resin is less viscous than results from the sulfite liquor concentrate where a plasticizing agent is used, but it may be satisfactorily employed as the principal ingredient in a binder for hardboard. Three hundred pounds of this sulfite liquor base resin, one hundred pounds of thermosetting phenol formaldehyde resin such as type MB-13 of the Borden Company, and fifty pounds of furfural may, for example, be mixed together and sprayed on a fiber mix to be incorporated in a mat, for consolidation under heat and pressure into hardboard. A fibrous mat of such material two inches thick may be consolidated into a hardboard sheet one-quarter inch thick if twenty pounds of such binder is incorporated with each one hundred pounds of dry fiber, and such mat is pressed at a pressure of four hundred pounds per square inch between platens at approximately 300° F. for six minutes, and the pressure is thereafter reduced to one hundred pounds per square inch and held for two minutes. Prior to addition of the binder to the fiber the fiber should have a moisture content of approximately seven percent.

Where a plasticizer is utilized, such as a chloride, the resulting sulfite liquor base resin is considerably thicker. An example of such a composition is as follows:

Example II

|   | Lbs. |
|---|---|
| Sulfite liquor concentrated to 45% to 55% solids | 1,000 |
| Sodium hydroxide | 40 |
| Sodium resin soap | 10 |
| Furfural | 60 |
| Nickelous chloride | ½ |
| Cobaltous chloride | ½ |
| Cobalt naphthenate | 1 |
| Manganese naphthenate | 1 |

As mentioned previously, one or more of such chloride and naphthenate additives may be included in the sulfite liquor base resin. If chloride of a single type is used, it is preferred that the proportion of it be greater than for one of the chlorides given in the above formula. The process of making such resin may follow quite closely that discussed in the preparation of the resin using the ingredients of Example I. Part of the furfural may be added separately prior to the addition of the sodium resin soap, such as forty pounds, and such soap may be dissolved in the other twenty pounds of furfural, or the amount of furfural added separately can be varied within wide limits, or eliminated.

The completed waste sulfite liquor base resin resulting from Example II, being thicker than the resin resulting from Example I, is more suitable for use in the bonding of veneer into plywood or of already formed hardboard or paper to wood. For all such uses it is desirable to combine the sulfite liquor base resin with phenol formaldehyde resin, and a suitable combination has been found to be 180 pounds of sulfite liquor base resin, 90 pounds of bark flour filler, and 250 pounds of thermosetting phenol formaldehyde resin. This mixture is produced by mixing the ingredients in a conventional glue mixer for a period of fifteen minutes, and then the mixture is spread upon the surface to be bonded to the extent of fifty pounds of such mixture per thousand square feet of surface. This is the conventional quantity of adhesive applied where thermosetting phenol formaldehyde glue is used alone.

In bonding surfaces with such glue applied curing temperatures, pressures and time are the same as conventionally used for bonding thermosetting phenol formaldehyde resins, for example, a press platen temperature of 300° F., a pressure of 175 pounds per square inch, and a curing time of eight and one-half to nine and one-half minutes for curing five-ply plywood composed of 3/16-inch veneer sheets. The same temperature, pressure and time could be used in applying paper facings or hardboard facings to wood if the composite thickness of the package being pressed were comparable, namely about 13/16 inch. As customary, however, if the stack of pieces being joined is less than 13/16 of an inch in thickness, the time is reduced proportionately.

The sulfite liquor base resin of Example II is also suitable for use in an adhesive carried by paper stock of absorbent characteristics. A mixture of sulfite liquor resin, thermosetting phenol formaldehyde resin and furfural, for example, may be used, it having proportions by weight of two parts of the sulfite liquor base resin, one and one-half parts of thermosetting phenol formaldehyde resin, and one-half part of furfural. Paper in the nature of paper toweling, such as 33-pound Alfiber toweling of Crown Zellerbach Corporation, can be soaked in this mixture, and after the impregnated paper is allowed to dry it can be laid between sheets of veneer, wood, paper or hardboard and set under heat and pressure to bind such sheets together instead of applying the adhesive directly to the surfaces of the sheet in liquid form.

The chloride of Example II may be added after the addition of the furfural to the sulfite liquor concentrate and prior to the addition of the naphthenate. Instead of using one-half pound of nickelous chloride and one-half pound of cobaltous chloride, one pound of either may be used, and the other omitted. It has been found that better plasticizing action on the sulfite liquor lignin content is obtained if some of the chloride is added at the beginning of the cooking operation, and a still more effective plasticizing action occurs if all or most of the chloride is added in a pretreatment of the sulfite liquor concentrate prior to the cooking operation proper, when the sulfite liquor is heated to about 180° F. and gently agitated for a period of several hours.

A specific example of such pretreatment is to add chloride to 1,000 pounds of waste sulfite liquor concentrate having 45% to 55% solids causticized with one percent of the original weight of sulfite liquor with sodium hydroxide, which may include

*Example III*

| | Lbs. |
|---|---|
| Chromic chloride | 2 |
| Nickelous chloride | ½ |
| Copper chloride | ½ |
| Cobaltous chloride | ½ |

These chlorides first were dissolved in four gallons of water. The waste sulfite liquor was heated to a temperature of 180° F., and after addition of the chloride solution eight pounds of furfural were added and the agitation and heating at 180° F. was continued for a period of twelve hours. Such pretreatment enabled the final cooking operation to be completed more quickly.

As mentioned previously, chlorides of various metals can be used as plasticizers during cooking of the sulfite liquor concentrate, and the same is true in such pretreatment process. Aluminum chloride, for example, can be substituted for either nickelous chloride or copper chloride, or one pound of aluminum chloride could be substituted for both the nickelous chloride and the copper chloride. As another alternative two and one-half pounds of chromic chloride could be substituted for the four chlorides listed above, because the chromic chloride is considerably more effective than nickelous chloride, copper chloride or cobaltous chloride. Some copper chloride, such as one-half pound, is desirable, however, because of the fungusproof and rotproof qualities which it imparts to the resin.

Following the pretreatment discussed above, the chloride treated sulfite liquor concentrate may be cooked and treated by the addition of sodium hydroxide, furfural, sodium resin soap and naphthenate, as previously discussed. Particularly if copper chloride has not been utilized, it is desirable in such cooking process to incorporate part of the naphthenate as copper naphthenate, which will also provide fungusproof and rotproof qualities.

Particularly if the sulfite liquor base resin is to be used in a wood bonding operation, it will probably be desirable to incorporate formaldehyde, and perhaps phenol in addition, in the resin mass. Where one thousand pounds of sulfite liquor concentrate having from 45% to 55% solids is used as the resin base, for example, from 15 to 30 pounds of formaldehyde can be added effectively near the end of the cooking operation. The resulting resin will be thickened still further if phenol also is added in the same range, and preferably in an amount substantially equal to the amount of formaldehyde used.

Greater homogeneity and viscosity of the sulfite liquor base resin may be obtained by plasticizing the sulfite liquor concentrate with triethylene glycol. The remaining ingredients may be generally the same as discussed in the previous examples.

A list of typical ingredients and their quantities follows:

*Example IV*

| | Lbs. |
|---|---|
| Sulfite liquor concentrate 45% to 55% solids | 1,000 |
| Chromic chloride | 1½ |
| Cupric chloride | ½ |
| Nickelous chloride | ½ |
| Sodium hydroxide | 60 |
| Furfural | 68 |
| Triethylene glycol | 1 |
| Sodium resin soap (Vinsol NVX) | 15 |
| Phenol | 20 |
| Formaldehyde | 20 |
| Cobalt naphthenate | 1½ |
| Manganese naphthenate | 1 |

In the preparation of the resin using the foregoing ingredients the chromic chloride is dissolved in hot water, for example three gallons, and added to the concentrated sulfite liquor. The cupric chloride also dissolved in hot water, such as one gallon, is added, and after the concentrate has been agitated for a few minutes eight pounds of furfural are added. This mass is held at 180° F. for a period of two to eight hours to complete the pretreatment conditioning.

Cooking of the sulfite liquor concentrate to transform it into resin is initiated by raising the temperature substantially to the boiling point and adding the triethylene glycol. The nickelous chloride dissolved in hot water, approximately one gallon, also is added, and the mass is boiled and agitated at approximately 216° F. for at least one hour. Next the sodium hydroxide is added, and because of the exothermic nature of the reaction which occurs, the temperature may rise to the range of 224° F. to 230° F. Such cooking is continued for approximately thirty minutes and sixty pounds of furfural, the sodium resin soap dissolved, for example, in hot water, and finally, together, the phenol and formaldehyde, are added at intervals between each addition of approximately fifteen minutes while the mass is kept continually under agitation at the boiling temperature. Finally the napthenate is added, and after boiling for fifteen minutes to one-half hour, the pH of the resulting resin is determined. If the test shows that the pH is below pH 9 additional sodium hydroxide may be added as necessary to increase the pH value to 9 or any desired higher value.

In order to retain as much resinifiable material of the sulfite liquor as possible in the mass, the boiling mentioned above should be done in a closed cooker as discussed previously, and all vapor should be condensed and returned to the cooking liquid.

Resin resulting from Example IV is effective for use in bonding exterior grade plywood of waterproof character by mixing 120 pounds of such sulfite liquor base resin with 100 pounds of comminuted bark or bark flour and 200 pounds of thermosetting phenol formaldehyde resin such as No. 542 of Monsanto Chemical Company. This adhesive mixture further is improved by addition of a small amount, such as four pounds, of sodium resin soap (Vinsol NVX) and a small amount, such as one-half pound, of triethylene glycol. Such resin mixture may be applied to the veneer in the usual manner used in the manufacture of plywood and may be bonded by being subjected to heat and pressure in accordance with the curing cycle customarily used for thermosetting phenol formaldehyde resins alone.

A resin having a sulfite liquor base incorporating a cumar resin instead of the sodium resin soap contains the following ingredients:

Example V

| | Lbs. |
|---|---|
| Sulfite liquor concentrate 45% to 55% solids | 1,000 |
| Triethylene glycol | 2 |
| Nickelous chloride | 2 |
| Sodium hydroxide | 60 |
| Furfural | 60 |
| Phenol | 20 |
| Formaldehyde | 30 |
| Cumar resin | 4 |
| Manganese naphthenate | 1½ |
| Cobalt naphthenate | ½ |

The cumar resin can be grade MH-2½ of the Barrett Division of Allied Chemical and Dye Corporation.

The method of preparation can follow generally the procedure discussed in connection with Example IV. The triethylene glycol may be added either immediately after the pretreatment conditioning or may be added during the pretreatment, such as simultaneously with the chloride dissolved in hot water. Similarly, all the chloride may be added during the pretreatment, or part of it at the beginning of the cooking period, as discussed in connection with Example IV.

In the initial stages of the cooking period it is preferred that only part of the furfural be added, such as fifty pounds, the balance of ten pounds being used as a solvent for the cumar resin added later. Also, while this cumar resin could be added with all the furfural, the phenol and formaldehyde may be added after most of the furfural, and the cumar resin dissolved in furfural added after the phenol and formaldehyde. As in the procedures discussed previously, the batch of sulfite liquor concentrate being processed should be boiled for a short time, such as fifteen minutes, between the addition of the furfural, the addition of the phenol and formaldehyde, and the addition of the cumar resin in order to afford an opportunity for the successive ingredients to combine with the preceding ingredients.

As in the process described in connection with Example IV, the napthenate is added last, and after the batch is boiled for a final fifteen minutes or so, it is cooled to 180° F., after which it may be removed from the cooker.

It will be understood that various proportions of the several ingredients may be utilized in the production of sulfite liquor base resin, and the cooking process times and precise order of addition of ingredients are not critical. Also, the resin mixtures for making the final adhesives may be varied considerably within the principles of this invention as exemplified by the foregoing examples.

I claim as my invention:

1. A thermosetting resin binder containing a reaction product of furfural and alkalized sulfite liquor, and a sodium soap of pine tree resin.

2. The method of treating waste sulfite liquor which comprises concentrating the liquor and cooking the concentrated liquor with caustic alkali and furfural, and during such cooking capturing components of the liquid which vaporize, condensing such vapors and returning the condensate to the liquid for incorporation therein.

References Cited in the file of this patent
UNITED STATES PATENTS

| | | |
|---|---|---|
| 1,143,714 | Knight | June 22, 1915 |
| 2,159,411 | Wallace | May 23, 1939 |
| 2,161,749 | Samaras | June 6, 1939 |
| 2,485,327 | Snow | Oct. 18, 1949 |
| 2,579,481 | Fenn | Dec. 25, 1951 |
| 2,585,977 | Uschmann | Feb. 19, 1952 |
| 2,615,883 | Sweeney et al | Oct. 28, 1952 |

OTHER REFERENCES

Ellis: The Chemistry of Synthetic Resins, page 747, 4th paragraph, Reinhold Publishing Corp., New York, 1935.

Ellis: Chemistry of Synthetic Resins, volume I, pages 206, 207, 1935.

J. Soc. Chem. Ind., 1924, volume 43, page 303B.